United States Patent
Wang et al.

(10) Patent No.: US 10,922,342 B2
(45) Date of Patent: Feb. 16, 2021

(54) SCHEMALESS SYSTEMS AND METHODS FOR AUTOMATICALLY BUILDING AND UTILIZING A CHATBOT KNOWLEDGE BASE OR THE LIKE

(71) Applicant: Stratifyd, Inc., Charlotte, NC (US)

(72) Inventors: Xiaoyu Wang, Charlotte, NC (US); Guangchi Liu, Charlotte, NC (US)

(73) Assignee: STRATIFYD, INC., Charlotte, NC (US)

( * ) Notice: Subject to any disclaimer, the term of this patent is extended or adjusted under 35 U.S.C. 154(b) by 207 days.

(21) Appl. No.: 16/004,508

(22) Filed: Jun. 11, 2018

(65) Prior Publication Data

US 2019/0377824 A1 Dec. 12, 2019

(51) Int. Cl.
| | |
|---|---|
| *G06F 16/00* | (2019.01) |
| *G06F 16/332* | (2019.01) |
| *G06N 20/00* | (2019.01) |
| *G06F 16/33* | (2019.01) |

(52) U.S. Cl.
CPC ...... *G06F 16/3329* (2019.01); *G06F 16/3344* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 7,209,876 | B2* | 4/2007 | Miller | G10L 15/22 |
| | | | | 704/9 |
| 9,639,602 | B2* | 5/2017 | Ben Shahar | G06F 16/319 |
| 10,127,274 | B2* | 11/2018 | Moreno | G06F 16/24522 |
| 10,387,409 | B2* | 8/2019 | Calo | G06F 16/243 |
| 10,482,885 | B1* | 11/2019 | Moniz | G06F 3/167 |
| 10,521,422 | B2* | 12/2019 | Abu-Saba | G06F 16/285 |
| 10,762,438 | B1* | 9/2020 | Zhang | G06N 20/00 |
| 2016/0140216 | A1* | 5/2016 | Allen | G06N 20/00 |
| | | | | 707/722 |
| 2017/0109355 | A1* | 4/2017 | Li | G06N 3/0445 |
| 2018/0276525 | A1* | 9/2018 | Jiang | G06F 40/30 |

* cited by examiner

*Primary Examiner* — Debbie M Le
(74) *Attorney, Agent, or Firm* — Morris, Manning & Martin, LLP; Daniel E. Sineway, Esq.

(57) ABSTRACT

Schemaless systems and methods for automatically building and utilizing a chatbot knowledge base or the like. Textual analytics tools, such as natural language processing (NLP) and/or deep learning engines, are used to analyze the knowledge base and uncover and highlight gaps, which are turned into topics. Predetermined answers to these queries can then be prepared manually, or by an artificial intelligence (AI) algorithm with alternative database visibility. In this manner, new question-and-answer (Q&A) pairs are generated by the systems and methods in an automated manner, for later use by a chatbot, coaching system, or the like. These processes are iterative. Advantageously, transferring the processes from manual control to automated control greatly conserves resources.

21 Claims, 2 Drawing Sheets

SCHEMALESS SYSTEMS AND METHODS FOR AUTOMATICALLY BUILDING AND UTILIZING A CHATBOT KNOWLEDGE BASE OR THE LIKE

FIELD OF THE INVENTION

The present invention relates generally to the customer service, chatbot, and data analytics fields. More specifically, the present invention relates to schemaless systems and methods for automatically building and utilizing a chatbot knowledge base or the like. The systems and methods of the present invention utilize textual analytics tools to automatically identify gaps in a knowledge base such that it may be made more complete.

BACKGROUND OF THE INVENTION

In customer service and other applications, chatbots are often used to interact with customers in an automated manner, answering their queries with predetermined answers in real time. Textual analytics tools are used to analyze these queries and retrieve the appropriate answers from a knowledge base of predetermined answers. Alternatively, similar applications are used to coach customer service representatives that answer customer queries in person. Again, textual analytics tools are used to analyze the queries and retrieve the appropriate answers from a knowledge base of predetermined answers.

One problem with these approaches is that the knowledge base relied upon may be incomplete. Only inefficient and time consuming manual assessment is currently available to identify gaps in such a knowledge base. Unaddressed queries must be highlighted, appropriate answers must be prepared, and then these answers must be tagged for later use. The textual analytics tools alluded to above may, however, be used to automate and expedite this gap filling process. Such automated systems and methods are provided by the present invention.

BRIEF SUMMARY OF THE INVENTION

In various exemplary embodiments, the present invention provides schemaless systems and methods for automatically building and utilizing a chatbot knowledge base or the like. Textual analytics tools, such as natural language processing (NLP) and/or deep learning engines, are used to analyze the knowledge base and uncover and highlight gaps, which are turned into topics. Predetermined answers to these queries can then be prepared manually, or by an artificial intelligence (AI) algorithm with alternative database visibility. In this manner, new question-and-answer (Q&A) pairs are generated by the systems and methods in an automated manner, for later use by a chatbot, coaching system, or the like. These processes are iterative. Advantageously, transferring the processes from manual control to automated control greatly conserves resources.

In one exemplary embodiment, the present invention provides a system for automatically building a knowledge base, comprising: a question-and-answer detection module comprising a textual analytics tool operable for parsing a query to a platform utilizing an existing knowledge base to identify a missing question-and-answer pair associated with the existing knowledge base; an answer formulation module operable for manually or automatically generating an answer to the query to form a potential question-and-answer pair; a question-and-answer validation module operable for manually or automatically validating the formulated potential question-and-answer pair; and a question-and-answer substitution module operable for updating the existing knowledge base with the validated formulated potential question-and-answer pair to form a new knowledge base; wherein the platform is operable for receiving another query and responding utilizing the new knowledge base. The textual analytics tool comprises one or more of a natural language processing engine and a deep learning engine. The textual analytics tool is operable for generating one or more topics associated with the query. Manually generating the answer to the query comprises presenting the query to a user and receiving the answer from the user. Automatically generating the answer to the query comprises transmitting the query to an artificial intelligence engine and receiving the answer from the artificial engine. Manually validating the formulated potential question-and-answer pair comprises presenting the formulated potential question-and-answer pair to a user for approval. Automatically validating the formulated potential question-and-answer pair comprises presenting the formulated potential question-and-answer pair to an artificial intelligence engine for approval. The platform comprises one of a chatbot and a coaching system. The existing knowledge base is updated iteratively to form the new knowledge base.

In another exemplary embodiment, the present invention provides a method for automatically building a knowledge base, comprising: parsing a query to a platform utilizing an existing knowledge base to identify a missing question-and-answer pair associated with the existing knowledge base; manually or automatically generating an answer to the query to form a potential question-and-answer pair; manually or automatically validating the formulated potential question-and-answer pair; and updating the existing knowledge base with the validated formulated potential question-and-answer pair to form a new knowledge base; wherein the platform is operable for receiving another query and responding utilizing the new knowledge base. Parsing the query comprises parsing the query using one or more of a natural language processing engine and a deep learning engine. Parsing the query comprises generating one or more topics associated with the query. Manually generating the answer to the query comprises presenting the query to a user and receiving the answer from the user. Automatically generating the answer to the query comprises transmitting the query to an artificial intelligence engine and receiving the answer from the artificial engine. Manually validating the formulated potential question-and-answer pair comprises presenting the formulated potential question-and-answer pair to a user for approval. Automatically validating the formulated potential question-and-answer pair comprises presenting the formulated potential question-and-answer pair to an artificial intelligence engine for approval. The platform comprises one of a chatbot and a coaching system. The existing knowledge base is updated iteratively to form the new knowledge base.

In a further exemplary embodiment, the present invention provides a method for using a knowledge base, comprising: receiving, at a platform, a query from a user; and accessing a knowledge base comprising a plurality of question-and-answer pairs to locate a question-and-answer pair that comprises an answer to the query from the user; wherein the knowledge base if formed by: parsing a query to the platform utilizing a prior knowledge base to identify a missing question-and-answer pair associated with the prior knowledge base; manually or automatically generating an answer to the query to form a potential question-and-answer pair; manually or automatically validating the formulated potential question-and-answer pair; and updating the existing knowledge base with the validated formulated potential question-and-answer pair to form the knowledge base. Parsing the query comprises parsing the query using one or more of a natural language processing engine and a deep learning engine. The platform comprises one of a chatbot and a coaching system.

BRIEF DESCRIPTION OF THE DRAWINGS

The present invention is illustrated and described herein with reference to the various drawings, in which like reference numbers are used to denote like system components/method steps, as appropriate, and in which.

DETAILED DESCRIPTION OF THE INVENTION

Again, the present invention provides schemaless systems and methods for automatically building and utilizing a chatbot knowledge base or the like. Textual analytics tools, such as NLP and/or deep learning engines, are used to analyze the knowledge base and uncover and highlight gaps, which are turned into topics. The inputs of the system include two parts: an existing knowledge base and a large number of Q&A pairs. The Q&A pairs are extracted from conversation histories, for example. A NLP engine is employed to conduct preprocessing on both the knowledge base and the Q&A pairs. This preprocessing includes tokenization, stop word filtering, occurrence counting, etc. The preprocessed inputs are further delivered to a deep learning engine. The functionalities of the deep learning engine lie in two areas: detecting queries relevant to existed answers in the knowledge base and filtering queries irrelevant to the knowledge base and turning them into distinct topics. These functionalities are realized via analyzing the text similarities among queries and answers in the knowledge base. Predetermined answers to these queries can then be prepared manually, or by an AI algorithm with alternative database visibility. In this manner, new Q&A pairs are generated by the systems and methods in an automated manner, for later use by a chatbot, coaching system, or the like. These processes are iterative, meaning more and more Q&A pairs are continually injected into the knowledge base, such that it will cover more and more queries over time. Advantageously, transferring the processes from manual control to automated control greatly conserves resources.

Figure 1:
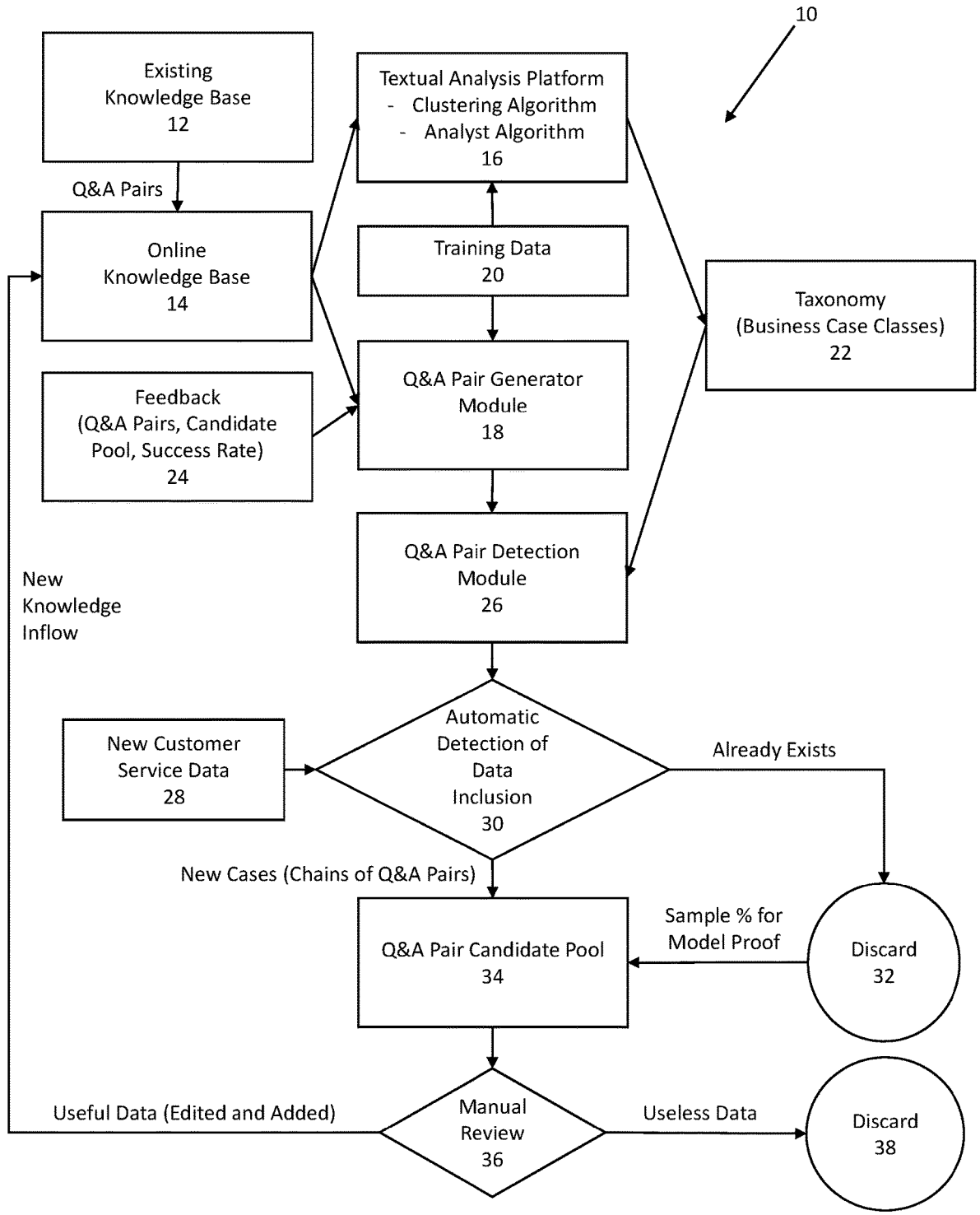
FIG. 1 is a flowchart illustrating one exemplary embodiment of the knowledge base system and method of the present invention, highlighting the automated building of a knowledge base.

Referring now specifically to FIG. 1, in one exemplary embodiment, a system/method 10 for automatically building a knowledge base, includes an existing knowledge base 12 that is implemented as an online knowledge base 14 by transforming data from the existing knowledge base 12 into usable Q&A pairs. The Q&A pairs are extracted from conversation histories via rule-based methods that eliminate contents that are too short or meaningless. The online knowledge base 14 with the usable Q&A pairs (and version control) is accessed by a textual analytics platform 16 or the like. Such textual analytics platforms are well known to those of ordinary skill in the art and utilize an NLP engine to parse text queries. The Q&A pairs are input into the platform for tokenization, stop word elimination, occurrence counting, etc. The output of the platform is vectorized (either in the form of bags of words or a sequential index list). The online knowledge base 14 with the usable Q&A pairs (and version control) is also accessed by a Q&A pair generator module 18 operable for generating Q&A pairs that are used to manually or automatically answer queries. Both the textual analytics platform 16 and the Q&A pair generator module 18 operate using a set of training data 20, such that machine learning is implemented and continuously improves performance. Particularly, the text analytics platform 16 takes the training data as input and runs text clustering algorithms, such as Latent Dirichlet Allocation (LDA), to discover hidden topics in the training set and provide a tree-like taxonomy 22 (e.g., business case classifications) to represent the hierarchical structure of these topics. The taxonomy information 22 is used by the Q&A Pair Generator Module 18 and the Q&A pair detection module 26 to roughly divide the training data 20, as well as the new customer service data 28, into business case classes. This operation aims to significantly narrow down the semantic matching space for the Q&A pairs, therefore speed up the processing time for automatic detection of data inclusion 30. On the other hand, the Q&A pair generator module 18 takes the online knowledge base 14 and training data 20 as input and outputs a deep neural network (DNN) that is trained upon these data. This DNN is used to encode texts into un-linear semantic vectors. The DNN is delivered to the Q&A pair detection module 26. Further, feedback 24 can be provided to the Q&A pair generator module 18 to gauge its performance. The feedback 24 includes labels associated with the Q&A pairs in 20. Each label indicates to which existing Q&A pair in the online knowledge base 14 the Q&A pair is relevant to. These are used as feedback signals to the DNN, such that the DNN is able to gauge its performance via adapting itself with respect to the labels.

The Q&A pair generator module 18 is coupled to or incorporates a Q&A pair detection module 26 operable for operable for identifying missing Q&A pairs associated with the online knowledge base 14 and/or existing knowledge base 12. This is done by receiving new customer service data 28 (e.g., new queries) and automatically determining if that customer service data is or is not addressed by the existing Q&A pairs generated by the Q&A pair generator module 18. This procedure takes advantage of the DNN generated in Q&A pair generator module 18 and taxonomy 22. Particularly, each of the new queries from new customer service data 28, as well as each of the Q&A pairs in the online knowledge base 14 are encoded by the DNN. Each of the encodings is a real number vector representing the semantic meaning of the Q&A pair in it. The pairwise semantic similarity between the Q&A pairs from new customer service data 28 and existing Q&A pairs from the online knowledge base 14 can therefore be obtained via calculating the distances, such as Euclidean distance or cosine distance, between them. Consequently, each individual Q&A pair from new customer service data 28 is assigned a score, which indicates the highest similarity between it and any certain existing Q&A pair from the online knowledge base 14. Note that within the reduced similarity matching space mentioned before, this pairwise similarity calculation is finished shortly. By ranking the Q&A pairs from new customer service data 28 by the scores in a descending order, the Q&A pairs in the new customer service data 28 that are the most relevant, as well as irrelevant, to the Q&A pairs in 14 can be identified. Of note, the "relevant" Q&A pairs in the new customer service data 28 indicates that the associated customer service data can be addressed by the Q&A pairs in the online knowledge base 14, and vice versa. In the Q&A pair generator module 18, if the customer service data is addressed by the Q&A pairs from the online knowledge base 14, then the associated potential new Q&A pair is discarded 32. If the customer service data is not addressed by the Q&A pairs from the online knowledge base 14, then the associated potential new Q&A pair is placed in a new Q&A pair candidate pool 34, including chains of Q&A pairs formulated from new cases. Of note, a percentage of the discarded Q&A pairs 32 may be sampled and included in the new Q&A pair candidate pool 34 for model proofing purposes. The new Q&A pair candidate pool is then reviewed manually or automatically using an artificial intelligence algorithm or the like 36. Data determined to be useless is again discarded 38. Data determined to be useful is edited and added to the online knowledge base 14 and/or existing knowledge base 12 for future use. Thus, the existing knowledge base 12 and online knowledge base 14 are iteratively refined—constantly addressing new customer service data 28 and incorporating new Q&A pairs such that previously unaddressed and evolving queries may be answered, whether by chatbot or a coaching system utilizing the existing knowledge base 12 and online knowledge base 14.

Figure 2:
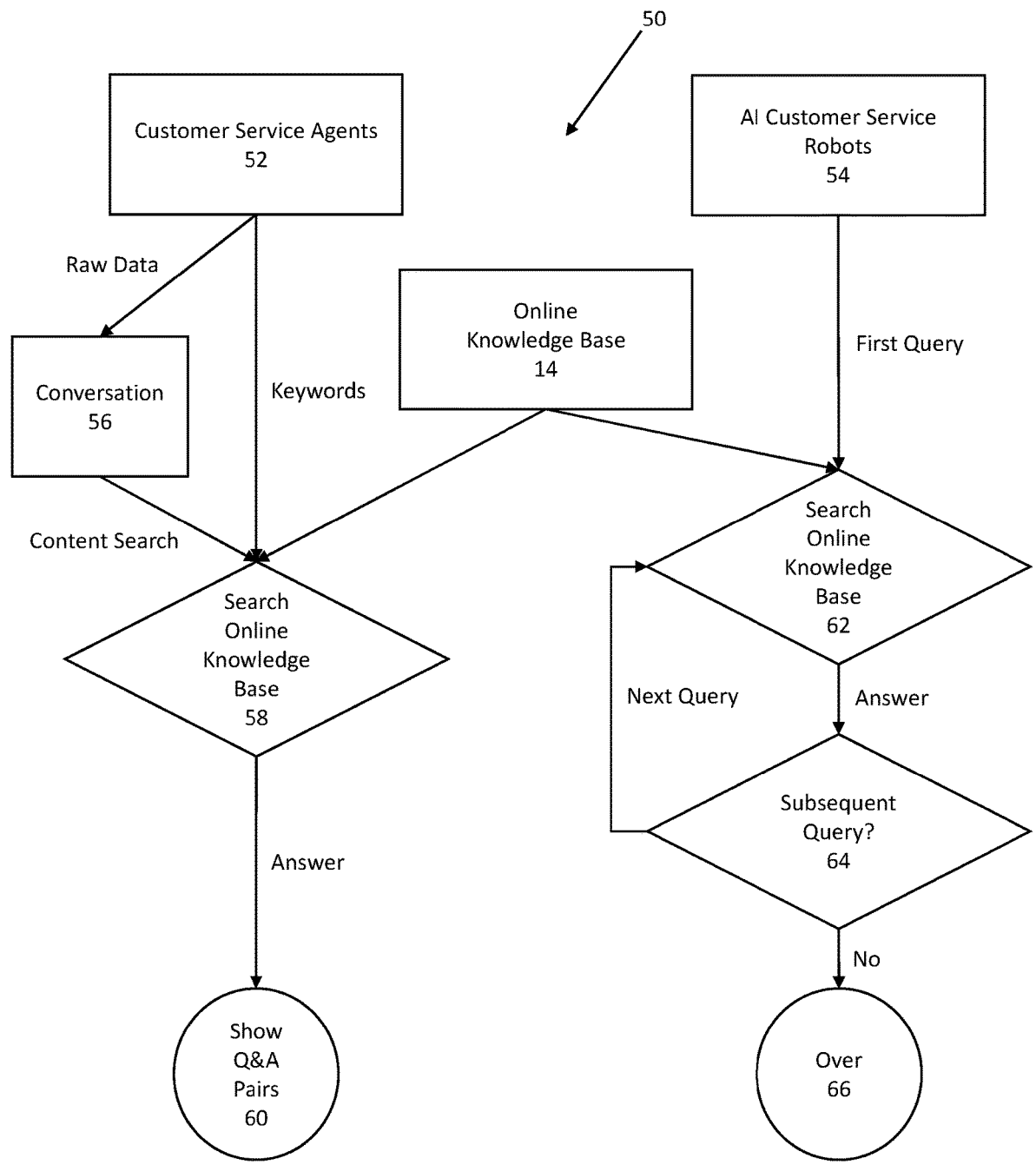
FIG. 2 is a flowchart illustrating another exemplary embodiment of the knowledge base system and method of the present invention, highlighting the use of the knowledge base of FIG. 1.

Referring now specifically to FIG. 2, in another exemplary embodiment, a system/method 50 for using an automatically built knowledge base utilizes different configurations based on the involvement of a customer service agent 52 or a AI customer service robot 54. In the customer service agent case, the customer service agent 52 types in keywords associated with a customer query or records the raw data associated with a customer conversation 56 such that an appropriate search can be done of the online knowledge base 14. The Q&A pairs in the knowledge base 14 are encoded into vectors in advance, which follows a similar process as introduced in Q&A pair generator module 18 from FIG. 1. In the searching process, the customer query/records are encoded as is introduced in the automatic detection of data inclusion 30 from FIG. 1. By taking advantage of the similar semantic matching process as introduced in FIG. 1, automatic detection of the data inclusion 30, an appropriate answer, which is the most relevant Q&A pair, can be located in the online knowledge base 14. Once an appropriate answer has been located, related Q&A pair cases 60 are presented to the customer service agent 52 for use. In the AI customer service robot case, the AI customer service robot 54 receives the query and transmits it to search the online knowledge base 14 to generate an appropriate answer 62. Similarly, the transmission for the query and the answer are all encoded as real number vectors and matched up by the semantic similarity between them, as is introduced in FIG. 1, related to the Q&A pair generator module 18. This answer is transmitted to the customer who may ask a follow-up question 64. This follow-up question 64 prompts another knowledge base search 62 until all follow-up questions 64 are exhausted, at which time the process ends 66.

Preferably, the software applications of the present invention are each implemented as coded instructions stored in a memory and executed by a processor. The processor is a hardware device, such as a server, for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory, to communicate data to and from the memory, and to generally control operations pursuant to the coded instructions. In an exemplary embodiment, the processor may include a mobile optimized processor, such as one optimized for power consumption and mobile applications. I/O interfaces can be used to receive user input and/or for providing system output. User input can be provided via, for example, a keypad, a touch screen, a scroll ball, a scroll bar, buttons, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a graphical user interface (GUI) that enables a user to interact with the memory. Additionally, the I/O interfaces may further include an imaging device, i.e. a camera, a video camera, various sensors, etc.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionality.

Accordingly, the present invention provides schemaless systems and methods for automatically building and utilizing a chatbot knowledge base or the like. Textual analytics tools, such as NLP and/or deep learning engines, are used to analyze the knowledge base and uncover and highlight gaps, which are turned into topics. Predetermined answers to these queries can then be prepared manually, or by an AI algorithm with alternative database visibility. In this manner, new Q&A pairs are generated by the systems and methods in an automated manner, for later use by a chatbot, coaching system, or the like. These processes are iterative. Advantageously, transferring the processes from manual control to automated control greatly conserves resources.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A system for automatically building a knowledge base, comprising:

memory storing question-and-answer detection instructions forming a textual analytics tool executed by a processor and operable for parsing a query to a platform utilizing an existing knowledge base to identify a missing question-and-answer pair associated with the existing knowledge base;

the memory storing answer formulation instructions executed by the processor and operable for manually or automatically generating an answer to the query to form a potential question-and-answer pair;

the memory storing question-and-answer validation instructions executed by the processor and operable for manually or automatically validating the formulated potential question-and-answer pair; and the memory storing question-and-answer substitution instructions executed by the processor and operable for updating the existing knowledge base with the validated formulated potential question-and-answer pair to form a new knowledge base;

wherein the potential question-and-answer pair associated with the query and question-and-answer pairs associated with the existing knowledge base are vector encoded by a deep neural network (DNN) and compared for semantic similarity distance to determine if the existing knowledge base is expanded to form the new knowledge base, wherein the DNN is trained with training data utilizing a text clustering algorithm to discover hidden topics and provide a taxonomy that informs data inclusion in the new knowledge base; and wherein the platform is operable for receiving another query and responding utilizing the new knowledge base.

2. The system of claim 1, wherein the textual analytics tool comprises one or more of a natural language processing engine and a deep learning engine.

3. The system of claim 1, wherein the textual analytics tool is operable for generating one or more topics associated with the query.

4. The system of claim 1, wherein manually generating the answer to the query comprises presenting the query to a user and receiving the answer from the user.

5. The system of claim 1, wherein automatically generating the answer to the query comprises transmitting the query to an artificial intelligence engine and receiving the answer from the artificial engine.

6. The system of claim 1, wherein manually validating the formulated potential question-and-answer pair comprises presenting the formulated potential question-and-answer pair to a user for approval.

7. The system of claim 1, wherein automatically validating the formulated potential question-and-answer pair comprises presenting the formulated potential question-and-answer pair to an artificial intelligence engine for approval.

8. The system of claim 1, wherein the platform comprises one of a chatbot and a coaching system.

9. The system of claim 1, wherein the existing knowledge base is updated iteratively to form the new knowledge base.

10. A method for automatically building a knowledge base, comprising:

parsing a query to a platform utilizing an existing knowledge base to identify a missing question-and-answer pair associated with the existing knowledge base;

manually or automatically generating an answer to the query to form a potential question-and-answer pair;

manually or automatically validating the formulated potential question-and-answer pair; and updating the existing knowledge base with the validated formulated potential question-and-answer pair to form a new knowledge base;

wherein the potential question-and-answer pair associated with the query and question-and-answer pairs associated with the existing knowledge base are vector encoded by a deep neural network (DNN) and compared for semantic similarity distance to determine if the existing knowledge base is expanded to form the new knowledge base, wherein the DNN is trained with training data utilizing a text clustering algorithm to discover hidden topics and provide a taxonomy that informs data inclusion in the new knowledge base; and wherein the platform is operable for receiving another query and responding utilizing the new knowledge base.

11. The method of claim 10, wherein parsing the query comprises parsing the query using one or more of a natural language processing engine and a deep learning engine.

12. The method of claim 10, wherein parsing the query comprises generating one or more topics associated with the query.

13. The method of claim 10, wherein manually generating the answer to the query comprises presenting the query to a user and receiving the answer from the user.

14. The method of claim 10, wherein automatically generating the answer to the query comprises transmitting the query to an artificial intelligence engine and receiving the answer from the artificial engine.

15. The method of claim 10, wherein manually validating the formulated potential question-and-answer pair comprises presenting the formulated potential question-and-answer pair to a user for approval.

16. The method of claim 10, wherein automatically validating the formulated potential question-and-answer pair comprises presenting the formulated potential question-and-answer pair to an artificial intelligence engine for approval.

17. The method of claim 10, wherein the platform comprises one of a chatbot and a coaching system.

18. The method of claim 10, wherein the existing knowledge base is updated iteratively to form the new knowledge base.

19. A method for using a knowledge base, comprising:

receiving, at a platform, a query from a user; and accessing a knowledge base comprising a plurality of question-and-answer pairs to locate a question-and-answer pair that comprises an answer to the query from the user;

wherein the knowledge base is formed by:

parsing a query to the platform utilizing a prior knowledge base to identify a missing question-and-answer pair associated with the prior knowledge base;

manually or automatically generating an answer to the query to form a potential question-and-answer pair;

manually or automatically validating the formulated potential question-and-answer pair; and updating the existing knowledge base with the validated formulated potential question-and-answer pair to form the knowledge base;

wherein the potential question-and-answer pair associated with the query and question-and-answer pairs associated with the prior knowledge base are vector encoded by a deep neural network (DNN) and compared for semantic similarity distance to determine if the prior knowledge base is expanded to form the knowledge base, wherein the DNN is trained with training data utilizing a text clustering algorithm to discover hidden topics and provide a taxonomy that informs data inclusion in the new knowledge base.

20. The method of claim 19, wherein parsing the query comprises parsing the query using one or more of a natural language processing engine and a deep learning engine.

21. The method of claim 19, wherein the platform comprises one of a chatbot and a coaching system.

\* \* \* \* \*